(12) United States Patent
Walker et al.

(10) Patent No.: US 11,233,633 B2
(45) Date of Patent: Jan. 25, 2022

(54) METHOD AND SYSTEM OF SECURED DIRECT LINK SET-UP (DLS) FOR WIRELESS NETWORKS

(71) Applicant: INTEL CORPORATION, Santa Clara, CA (US)

(72) Inventors: Jesse Walker, Portland, OR (US); Shlomo Ovadia, San Jose, CA (US); Suman Sharma, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 16/188,848

(22) Filed: Nov. 13, 2018

(65) Prior Publication Data

US 2019/0246268 A1    Aug. 8, 2019

Related U.S. Application Data

(63) Continuation of application No. 15/194,237, filed on Jun. 27, 2016, now abandoned, which is a
(Continued)

(51) Int. Cl.
*H04L 9/08* (2006.01)
*H04L 29/06* (2006.01)
(Continued)

(52) U.S. Cl.
CPC .......... *H04L 9/083* (2013.01); *H04L 63/0428* (2013.01); *H04L 63/062* (2013.01);
(Continued)

(58) Field of Classification Search
CPC ..... H04W 12/02; H04W 76/14; H04W 12/00; H04W 4/00; H04W 12/03;
(Continued)

(56) References Cited

U.S. PATENT DOCUMENTS

| | | | |
|---|---|---|---|
| 2001/0016908 A1* | 8/2001 | Blake-Wilson ....... | H04L 9/0841 713/171 |
| 2004/0240412 A1* | 12/2004 | Winget ............. | H04W 12/0602 370/331 |

(Continued)

*Primary Examiner* — Thanhnga B Truong
(74) *Attorney, Agent, or Firm* — Kacvinsky Daisak Bluni PLLC

(57) ABSTRACT

Method and system of secured direct link set-up (DLS) for wireless networks. In accordance with aspects of the method, techniques are disclosed for setting up computationally secure direct links between stations in a wireless network in a manner that is computationally secure. A direct link comprising a new communication session is set up between first and second stations in a wireless local area network (WLAN) hosted by an access point (AP), the direct link comprising a new communication session. The AP generates a unique session key for the new communication session and transfers secured copies of the session key to each of the first and second stations in a manner under which only the first and second stations can obtain the session key. A security mechanism is then implemented on the unsecured direct link to secure the direct link between the first and second stations using a secure session key derived from the session key.

17 Claims, 8 Drawing Sheets

Related U.S. Application Data continuation of application No. 13/164,989, filed on Jun. 21, 2011, now Pat. No. 9,380,457, which is a continuation of application No. 12/590,356, filed on Nov. 6, 2009, now Pat. No. 7,995,546, which is a continuation of application No. 11/266,439, filed on Nov. 3, 2005, now abandoned.

(51) Int. Cl.
| | | |
|---|---|---|
| *H04W 12/03* | (2021.01) | |
| *H04W 76/14* | (2018.01) | |
| *H04W 84/18* | (2009.01) | |
| *H04W 84/12* | (2009.01) | |

(52) U.S. Cl.
CPC ........... *H04W 12/03* (2021.01); *H04W 76/14* (2018.02); *H04L 2209/80* (2013.01); *H04L 2463/061* (2013.01); *H04L 2463/062* (2013.01); *H04W 84/12* (2013.01); *H04W 84/18* (2013.01)

(58) Field of Classification Search
CPC ........... H04W 36/0088; H04W 12/062; H04W 76/11; H04L 9/083; H04L 63/0428; H04L 9/08; H04L 12/56; H04L 29/06; H04L 63/062; H04L 12/28; H04L 9/0841; H04Q 7/00
USPC ........................................................ 380/270
See application file for complete search history.

(56) References Cited

U.S. PATENT DOCUMENTS

2006/0215601 A1* 9/2006 Vleugels ............... H04W 28/26
 370/328
2007/0242665 A1* 10/2007 Habetha ................ H04W 76/11
 370/389

\* cited by examiner

METHOD AND SYSTEM OF SECURED DIRECT LINK SET-UP (DLS) FOR WIRELESS NETWORKS

CROSS-REFERENCE TO RELATED APPLICATIONS

This application is a continuation of U.S. patent application Ser. No. 15/194,237, entitled "METHOD AND SYSTEM OF SECURED DIRECT LINK SET-UP (DLS) FOR WIRELESS NETWORKS", filed on Jun. 27, 2016, which is a continuation of U.S. patent application Ser. No. 13/164,989, filed on Jun. 21, 2011, and issued on Jun. 28, 2016 as U.S. Pat. No. 9,380,457, which is a continuation of U.S. patent application Ser. No. 12/590,356, filed on Nov. 6, 2009, and issued on Aug. 9, 2011 as U.S. Pat. No. 7,995,546, which is a continuation of U.S. patent application Ser. No. 11/266,439, filed on Nov. 3, 2005, the subject matter of which are hereby incorporated by reference in their entireties.

FIELD OF THE INVENTION

The field of invention relates generally to wireless networks and, more specifically but not exclusively relates to techniques for implementing secure direct links between wireless network stations.

BACKGROUND INFORMATION

In recent years, network reach and flexibility has been greatly enhanced through the development and deployment of wireless networks. Among many different wireless protocols are now available (e.g., Wi-Fi, Bluetooth, infared, various cellular transmission schemes, WiMax, etc.), a large number of wireless networks deployed today employ wireless network components that operate under the IEEE (Institute for Electronic and Electrical Engineers) 802.11 suite of standards.

The most numerous WLAN (wireless local area network) deployments, commonly referred to as "Wi-Fi" (wireless fidelity) networks, employ an air interface operating in the 2.4-gigahertz (GHz) frequency range. The original Wi-Fi standard was developed by the Wireless Ethernet Compatibility Alliance (WECA), and is based on the IEEE 802.11a specification. The IEEE Standard provides support for three different kind of PHY layers, which are an InfraRed (IR) baseband PHY, a frequency-hopping spread spectrum (FHSS) and a direct-sequence spread spectrum (DSSS) PHY operating at either 2.4 GHz or 5 GHz frequency band. For IEEE 802.11b, this results in a bandwidth of up to 11 megabits per second (Mb/s) when an appropriate signal strength is available. IEEE 802.11g defines a similar standard to Wi-Fi, with backward compatibility to 802.11b. However, 802.11g employs orthogonal frequency-division multiplexing (OFDM) rather than DSSS, and supports bandwidth up to 54 Mb/s. Enhanced implementations of 802.11g are asserted by their manufacturers to support transfer rates of up to 108 Mb/s. WLAN equipment employing the IEEE 802.11a standard has also been recently introduced. The 802.11a standard employs a 5 GHz air interface using an OFDM carrier.

A typical 802.11 WLAN deployment implemented with a single wireless access point (AP) 100 is shown in FIG. 1. Wireless AP 100 provides WLAN connectivity to various WLAN stations (STA) within its coverage area 102 via a respective 802.11 link, as depicted by notebook computers 104 and 106, desktop computers 108 and 110, and hand-held wireless device 112 (e.g., personal digital assistants (PDAs), pocket PCs, cellular phones supporting 802.11 links, etc.). (For illustrative purposes, coverage area 102 is shown as a circular shape, although in practice, the actual shape of a particular coverage area will generally vary based on various obstacles and signal interference from external sources.) To support station-side operations, each station provides an appropriate WLAN interface, such as depicted by a PCMCIA 802.11b, g, or a card 114 for notebook computer 106 or an 802.11b, g, or a peripheral expansion card 116 for desktop computer 110. Optionally, the IEEE 802.11 wireless interface may be built-in, such as is the case with notebooks employing Intel's Centrino® chipset. Similarly, wireless handheld devices (e.g., 112) will provide built-in IEEE 802.11 interfaces.

In most deployments, a wireless AP is deployed to extend the reach of a network, such as a LAN, WLAN (wide LAN) or MAN (Metropolitan Area Network). Accordingly, AP 100 is depicted as being linked to a switch 118 via an Ethernet (IEEE 802.3) link 120. In general, switch 118 is representative of various types of switches and routers present in a typical LAN, WLAN or MAN. In some cases, the switching operations may be facilitated via a server 122 that runs software to manage the network and perform software-based switching/routing operations.

A group of stations coordinated by Distributed Coordination Function (DCF) or Point Coordination Function (PCF) is called a basic service set (BSS). In the Infrastructure mode, the AP facilitates and coordinates communication and channel access between stations, and provides access mechanisms for the stations to access various land-based networks via network infrastructure connected to an AP, such as depicted by switch 118, enterprise network 124 and Internet 126. Stations authenticated and associated with an AP do not operate in an ad-hoc mode where peer-to-peer communication is done without connectivity to the AP. Thus, in the infrastructure mode, the AP serves as a central controller and coordinators for data traffic between stations within its coverage area by providing a routing function on the WLAN side. Furthermore, an AP provides another routing function pertaining to the routing of downlink traffic originating from an upstream network (such as enterprise network 124 and Internet 126, as well as traffic originating from other APs) and destined for a WLAN station served by the AP.

In general, stations in an IEEE 802.11 WLAN are not allowed to transmit frames directly to one another and should always rely on the AP for the delivery of frames. However, the IEEE has recently ratified a draft Standard (IEEE P802.11e/D13.0, January 2005) defining Quality of Service (QoS) enhancements for 802.11 Medium Access Control (MAC) layer. According to Section 11.7, stations with QoS facility (QSTAs) may transmit frames directly to another QSTA by setting up such a data transfer using the DLS (Direct Link Set-up) protocol.

In connection with support for direct links between stations, security measures have also been defined under the IEEE P802.11e/D13.0 draft Standard. However, the security measures are insufficient to support direct links with adequate security levels.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Embodiments of methods and apparatus for implementing secured direct links in wireless networks are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In accordance with aspects of the embodiments now described, techniques are disclosed for implementing secure direct links between stations in wireless networks. During secure direct link setup, new keys are generated for each secure session between a pair of linked stations, such that each secure session is always provided with a "fresh" set of keys. Furthermore, the keys are generated and distributed in a manner under which they cannot (computationally) be intercepted or otherwise identified via eavesdropping over the shared 802.11 air interface. This provides significant enhancements of the measures for implementing a secure direct link under the IEEE P802.11e/D13.0 draft Standard.

Figure 1:
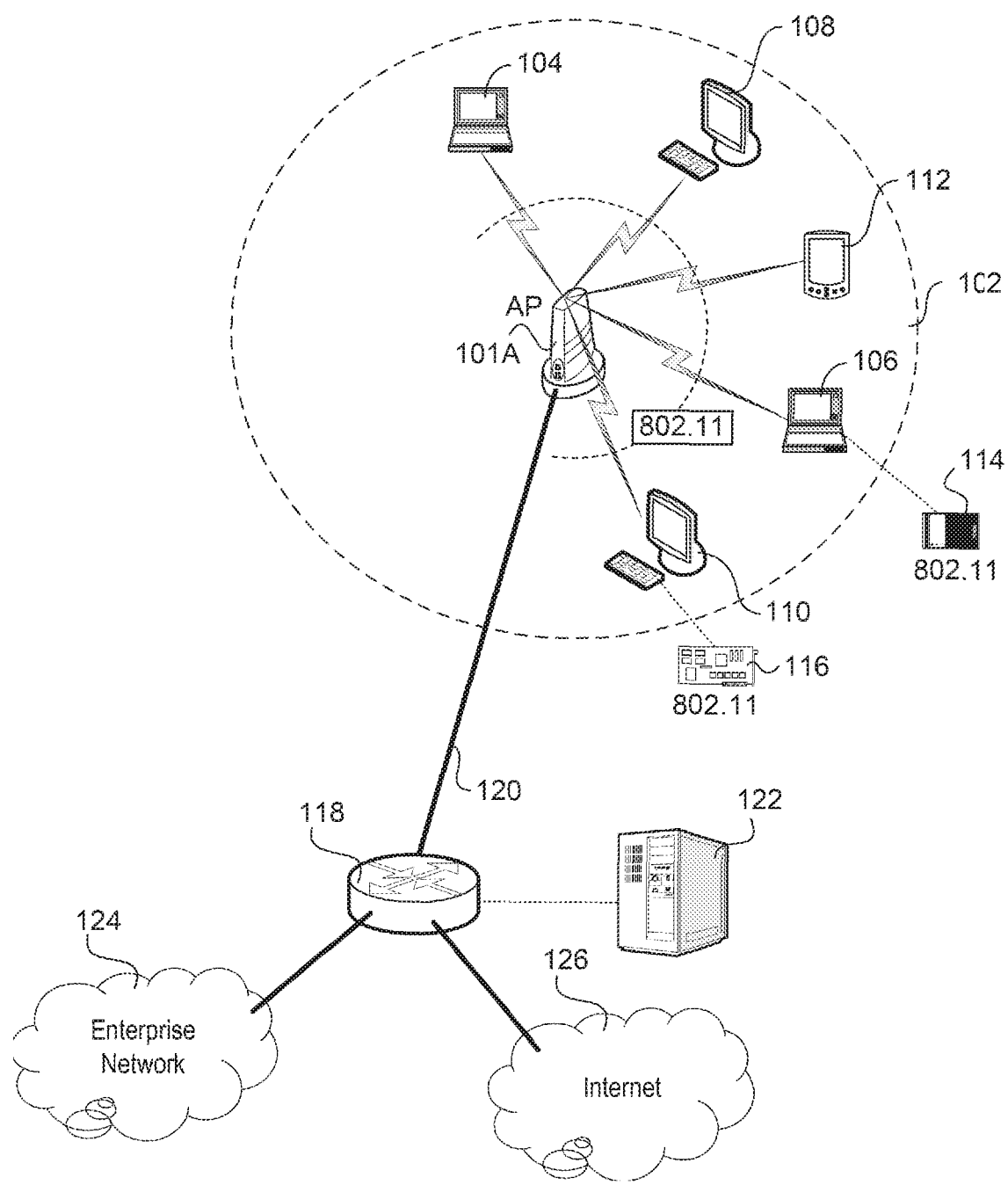
FIG. 1 is a schematic diagram illustrating a typical IEEE 802.11 WLAN deployment.
Figure 2:
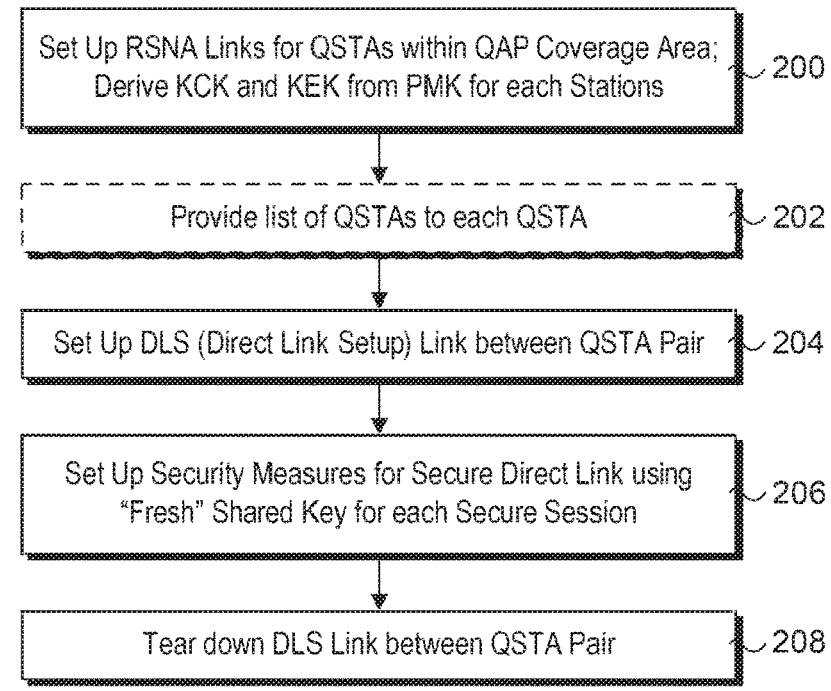
FIG. 2 is a flowchart illustrating high-level details of operations performed to set up a direct secure link, according to one embodiment of the invention.

As an overview, FIG. 2 depicts a flowchart illustrating high-level details of operations performed to set up a secure direct link, according to one embodiment of the invention. The process begins in a block 200, wherein RSNA (Robust Security Network Association) links (defined in the IEEE P802.11i™-2004 Standard are set up between QSTAs with a WLAN coverage area of a host QAP (an access point supporting enhanced QoS facilities in accordance with IEEE P802.11e/D13.0). During the RSNA link set up operation, a primary master key (PMK) from which a Key Confirmation Key (KCK) and a Key Encryption Key (KEK) are subsequently derived is generated by the QAP for each QSTA.

As depicted in an optional block 202, in some embodiments a list of QSTAs is provided to each QSTA (or otherwise selected QSTAs). The list may be statically generated in advance, may be dynamically generated during on-going operations, or a combination of these two approaches may be employed. For example, in many managed networks, only authorized stations are allowed to access a WLAN. Since these stations are known in advance by a network manager or the like, the network manager can provide information to each station that can operate as a QSTA concerning other stations that can also operate as a QSTA, thus informing each station capable of employing direct links under IEEE P802.11e/D13.0 of other QSTAs that may be reached within the WLAN. Under another scheme, when a QSTA joins a WLAN, its capabilities are broadcast to other QSTAs already in the WLAN, thus enabling those QSTAs to update their respective direct link QSTA lists.

Continuing at a block 204, the operations of this block and the following block 206 are performed to set up each secure direct link. First, a DLS link is set up between a pair of QSTAs in the manner described below with reference to FIG. 4. (As used herein, a link that is set up using the DLS protocol is termed a "DLS link.") This operation is initiated by an initiator QSTA that desires to form a secure direct link with a target QSTA. After the DLS link is set up, security measures are set up in block 206 to form a secure direct link using a "fresh" shared key that is unique for each secure session. Notably, the security measures are implemented using key transfer mechanisms that ensures the only the appropriate recipient end stations (i.e., the QSTAs sharing the direct link) can extract a symmetric session key from which a shared Pairwise Transient Key (PTK) is derived. Further details of the operation of block 206 are described below with reference to the message flow diagram of FIGS. 5a and 5b. At the end of the session, the DLS link between the QSTA Pair is torn down, as depicted in a block 208

Figure 3:
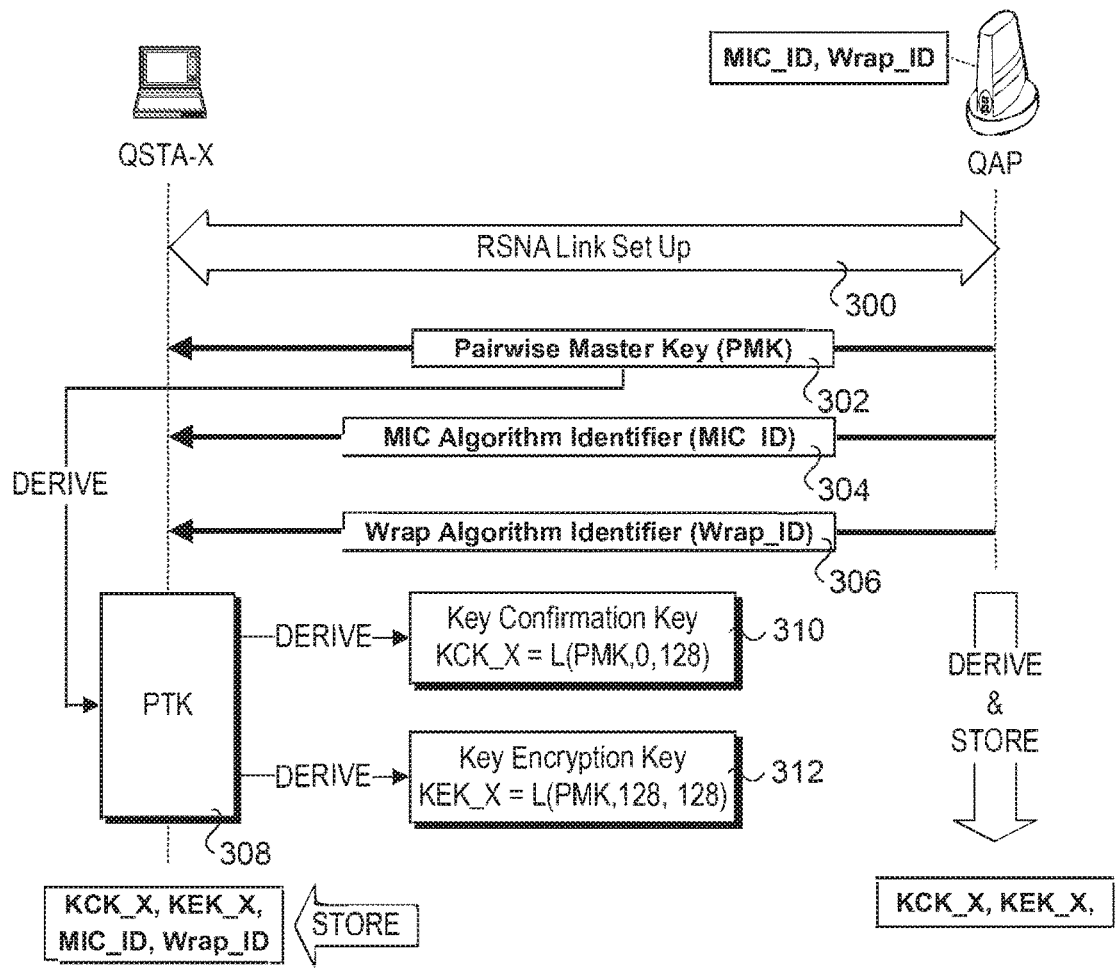
FIG. 3 is a message flow and schematic diagram illustrating operations performed in connection with setting up a Robust Security Network Association (RSNA) link between a station and an access point.

FIG. 3 shows further aspects of the RSNA link set-up operation of block 200. Details for setting up RSNA links for IEEE 802.11 WLANs are disclosed in the IEEE 802.11i™-2004 (Amendment 6: Medium Access Control (MAC) Security Enhancements) Standard. RSNA defines a number of security features in addition to wired equivalency privacy (WEP) and IEEE 802.11 authentication, both of which are typically used as baseline security measures for conventional 802.11 WLANs. These security features include enhanced authentication mechanisms for STAs, key management algorithms, and cryptographic key establishment. RNSA also features an enhanced data encapsulation mechanism that may be implemented using temporal keys corresponding to the Temporal Key Integrity Protocol (TKIP), as well as other security measures. RSNA by a pair of devices doesn't by itself provide robust security. Robust security is provided when all the devices in the network use RSNAs.

An RSNA relies on several components external to the IEEE 802.11 suite of Standards. The first component is an IEEE 802.1X (IEEE P802.1X-REV, Draft Standard for Local and Metropolitan Area Networks: Port-Based Network Access Control) port access entity (PAE). PAEs are present on all STAs in an RSNA and control the forwarding of data to and from the MAC. An access point implements an Authenticator PAE and implements the Extensible Authentication Protocol (EAP) Authenticator role, while a STA implements a Supplicant PAE and implements the EAP peer role. In an independent basic service set (IBSS) environment, each STA implements both an Authenticator PAE and a Supplicant PAE and both the EAP Authenticator and EAP peer roles.

A second component is the Authentication Server (AS). The AS may authenticate the elements of the RSNA itself, i.e., the non-AP STAs, while APs may provide material that the RSNA elements can use to authenticate each other. The AS communicates through the IEEE 802.1X Authenticator with the IEEE 802.1X Supplicant on each STA, enabling the STA to be authenticated to the AS and vice versa. An RSNA depends upon the use of an EAP method that supports mutual authentication of the AS and the STA. In certain applications, the AS may be integrated into the same physical device as the AP, or into a STA in an IBSS.

IEEE 802.11i™-2004 Standard uses the notion of a security association to describe secure operations. Secure communications are possible only within the context of a security association, as this is the context providing the state—cryptographic keys, counters, sequence spaces, etc.,— needed for correct operation of the IEEE 802.11™-2004 cipher suites.

As defined under section 8.4 (RSNA security association management) of IEEE 802.11i™-2004 Standard, a security association is a set of policy(ies) and key(s) used to protect information. The information in the security association is stored by each party of the security association, must be consistent among all parties, and must have an identity. The identity is a compact name of the key and other bits of security association information to fit into a table index or an MPDU (MAC protocol data unit).

Returning to FIG. 3, this figure shows operations performed at a QSTA X (QSTA-X) and a QAP to set up an RSNA link. In accordance with a message exchange 300, the RSNA link is set up by passing EAPOL- (EAP over LAN) Key frames between the QSTA-X and the QAP. The EAPOL-Key frames contain data pertinent to setting up an RSNA link, including various QSTA-X attributes (e.g., MAC address, capabilities, etc.) and key-related data. It is noted that a station need not be a QSTA to set up an RSNA link; however, a station will still need the QoS facility to perform direct links, as described below, for some embodiments.

During message exchange 300, the QAP will pass key information, along with information identifying algorithms to be subsequently employed for key extraction and authentication operations. These include a Pairwise Master Key (PMK) 302, a MIC (Message Integrity Code) algorithm identifier (MIC_ID) 304, and a Wrap encryption algorithm identifier (Wrap_ID) 306.

RSNA defines two key hierarchies: a) Pairwise key hierarchy, to protect unicast traffic, and b) Group Temporal Key (GTK), a hierarchy consisting of a single key to protect multicast and broadcast traffic. At the top of the Pairwise hierarchy is the Pairwise Masker Key (PMK). Under alternative approaches, a PMK can be derived from an EAP-based method or may be obtained directly from a pre-shared key (PSK). In one embodiment, the Pairwise key hierarchy utilizes PRF-384 or PRF-512 (Pseudo Random Function-X, as defined below, where X=number of bits) to derive session-specific keys from a 256 bit PMK. The Pairwise key hierarchy takes a PMK and generates a Pairwise Transient Key (PTK), as depicted in FIG. 3 by a PTK 308. The PTK is partitioned into the KCK (first 128 bits) and KEK (second 128 bits), and temporal keys used by the MAC to protect unicast communication between the Authenticator's and Supplicant's respective STAs.

Section 8.5.1.1 of the IEEE 802.11i™-2004 Standard defines the PRF function as follows, wherein A is a unique label for each different purpose of the PRF; Y is a single octet containing 0; X is a single octet containing the parameter; and ∥ denotes concatenation:

```
H-SHA-1(K, A, B, X) ← HMAC-SHA-1(K, A ∥ Y ∥ B ∥ X)
PRF(K, A, B, Len)
    for i ← 0 to (Len+159)/160 do
        R ← R ∥ H-SHA-1(K, A, B, i)
    return L(R, 0, Len)
PRF-128(K, A, B) = PRF(K, A, B, 128)
PRF-192(K, A, B) = PRF(K, A, B, 192)
PRF-256(K, A, B) = PRF(K, A, B, 256)
PRF-384(K, A, B) = PRF(K, A, B, 384)
PRF-512(K, A, B) = PRF(K, A, B, 512)
```

As shown in FIG. 3, each of a key configuration key (KCK_X) 310 and a key encryption key (KEK_X) 312 is derived from PTK 308 by QSTA-X and stored on QSTA-X, along with the MIC_ID and Wrap_ID. Similarly, values for KCK_X and KEK-X are derived by the QAP and stored on the QAP along with the MIC_ID and Wrap_ID (which were already stored on the QAP prior to setting up the RSNA link).

In a manner similar to that illustrated in FIG. 3, the QAP will set up an RSNA link with other applicable QSTAs in the WLAN. The net result of this is that (in addition to having an RSNA link set up) each QSTA will store a respective set of KCK and KEK key values, along with information identifying the MIC algorithm and Wrap algorithm employed by the WLAN security mechanism.

Figure 4:
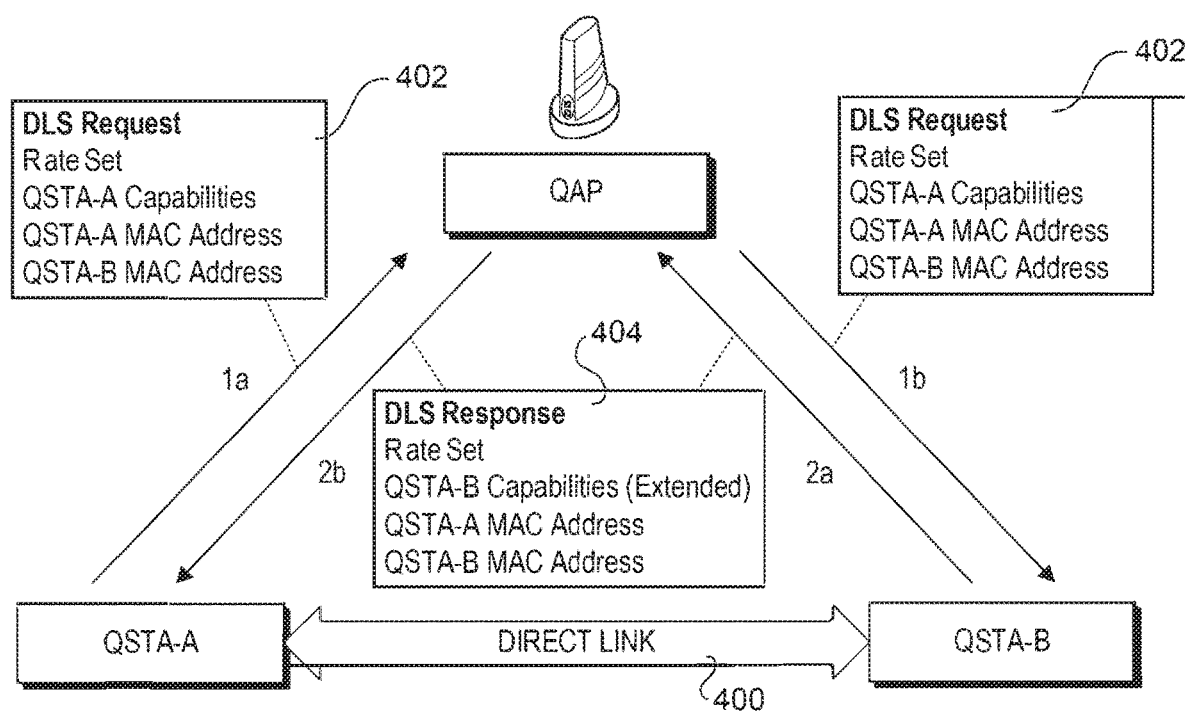
FIG. 4 is a message flow diagram illustrating a message exchange for setting up a Direct Link Setup (DLS) link in accordance with the IEEE P802.11e/D13.0 draft standard.

Details of the DLS link set up operation of block 204 are illustrated in FIG. 4. In particular, the DLS protocol to set up DLS link is discussed under section 11.7 of the IEEE P802.11e/D13.0 draft Standard. FIG. 4, which is analogous to FIG. 68.9 in section 11.7, shows four messages (1a, 1b, 2a and 2b) passed between QoS stations QSTA-A and QSTA-B and a QoS access point QAP to set up a direct link 400 between stations QSTA-A and QSTA-B. The DLS link set up operation proceeds as follows. Station QSTA-A, which intends to exchange frames directly with another non-AP station QSTA-B, invokes DLS and sends a DLS Request frame 402 to the QAP, as depicted by message 1a. The DLS Request frame includes the rate set, capabilities of QSTA-A, as well as the MAC addresses of QSTA-A (the initiator) and QSTA-B (the target recipient of the DLS Request).

If the target recipient (QSTA-B in this instance) is associated with the BSS for the QAP, direct streams (i.e., links) are allowed in the policy of the BSS, and the target recipient is a QSTA, the QAP then forward the DLS Request frame to the recipient, as depicted by message 1b. If the target recipient does not meet these qualifications, a message is returned from the QAP to the initiator indicating that the targeted station does not support direct links. In some instances, the QAP may not receive the DLS request frame from QSTA-A. Under this situation, the QSTA-A may re-send the DLS request frame to the QAP after a time-out period. As discussed above, under the optional operations of block 202, each QSTA is provided with a list of other available QSTA's. Accordingly, under such implementations, an initiator station will be able to ascertain whether a target station supports the applicable QoS facility to support direct links with that station prior to sending a DLS Request frame to that station.

If the recipient station accepts the request to set up a direct link with the initiator, it sends a DLS Response frame 404 to the QAP, as depicted by message 2a. The DLS Response frame contains the rate set, (extended) capabilities of QSTA-B, and the MAC addresses of QSTA-A and QSTA-B. The QAP then forwards the DLS Response frame to QSTA-A (message 2b), after which the direct link 400 becomes active and frames can be sent from QSTA-A to QSTA-B and from QSTA-B to QSTA-A.

Section 11.7.5 in the IEEE 802.11e/D13 draft Standard specifies a security scheme to enable secured DLS operation. However, the specified security scheme is insufficient to provide adequate security in today's environment. Specifically, the inventors have identified the following design flaws:

1. The IEEE 802.11i™-2004 or IEEE 802.11e/D13 Standards do not specify how the QAP generates the STAKey EAPOL-Key frames, and if it is strong or weak security key;
2. The AP does not bind the identities of the communicating parties using the key derivation. This allows any other party to reuse the key for an unauthorized purpose;
3. The DLS STA's do not use a handshake procedure link (e.g., a 4-Way Handshake) to verify the binding that the AP should have specified; and
4. The key derivation scheme for DLS is unspecified by IEEE 802.11i™-2004 and by IEEE 802.11e/D13 Standards. If the AP does not generate different and independent keys for different DLS sessions, all the security guarantee claims made by IEEE 802.11i™-2004 will be voided.

In accordance with aspects of the security mechanisms now described, techniques are disclosed for setting up secure direct links with substantial enhancements over the secure direct link scheme employed by the IEEE 802.11e/D13 draft Standard. These aspects not only address the aforementioned design flaws, but provide a key generation, distribution and implementation environment that is computationally secure. What these means is that given the current computer technology, it is not computationally feasible to "intercept" or otherwise identify the keys used for encrypting data sent over the secure links. Furthermore, the techniques may be easily extended to provide computationally secure protection for future, yet to be developed computer processing capabilities.

Figure 5A:
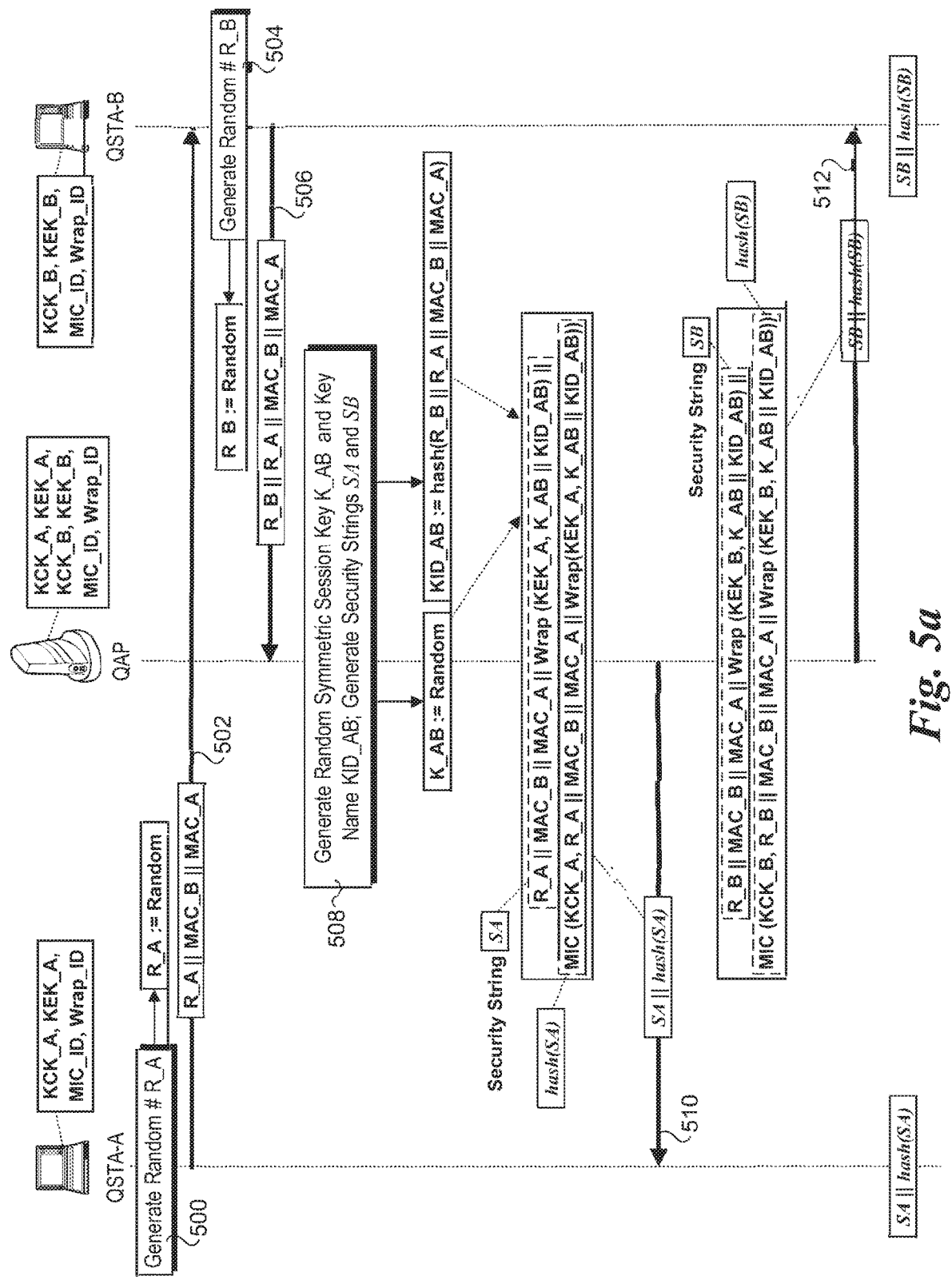
FIGS. 5a and 5b collectively comprise is a message flow diagram illustrating various messages passed between two stations and an access point to deploy a security mechanism for a direct link, according to one embodiment of the invention
Figure 5B:
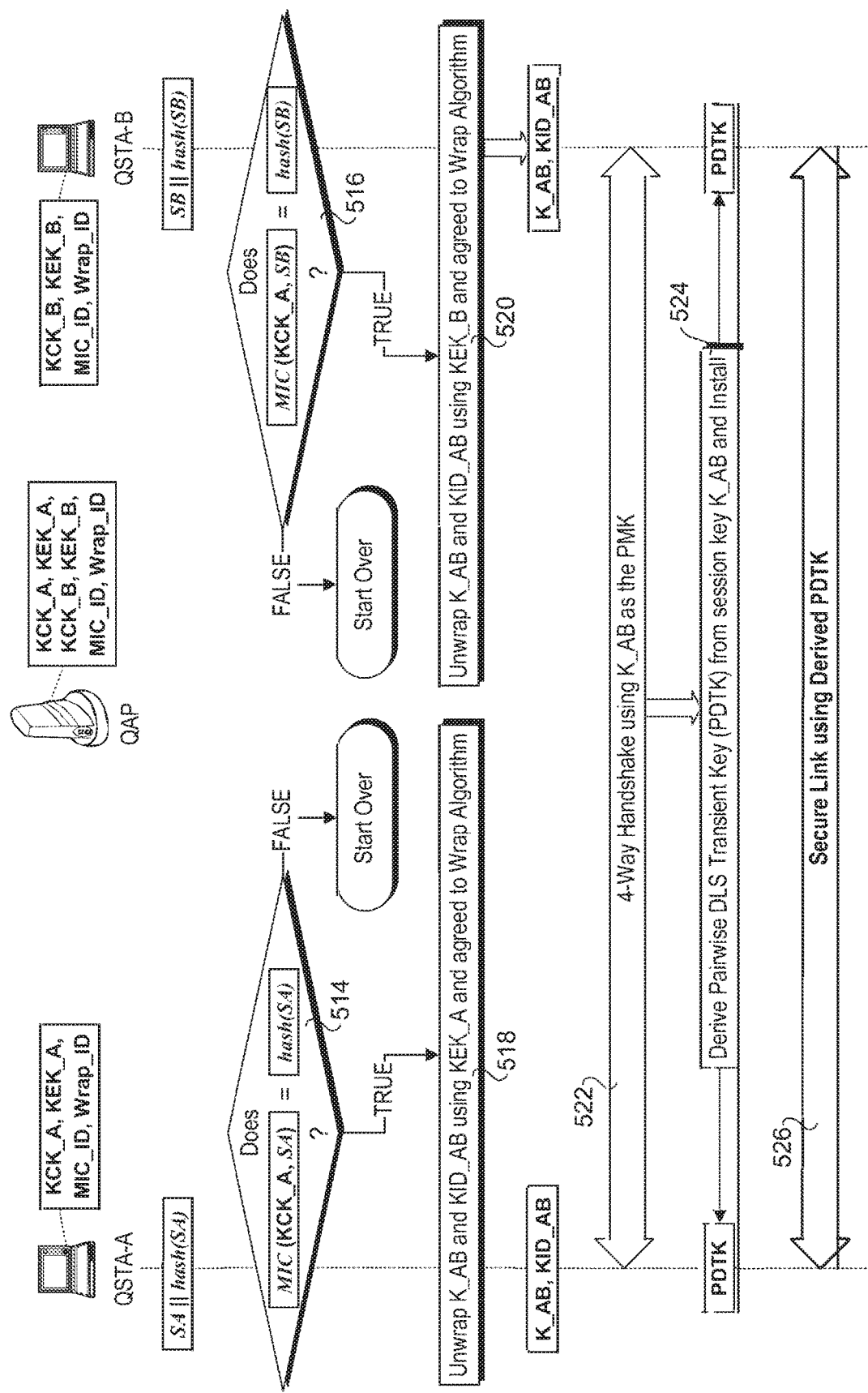

FIGS. 5a and 5b shows details of a message exchange process used to set up security measures for an established, but unsecured direct link, according to one embodiment of the invention. In general, the operations illustrated in FIGS. 5a and 5b correspond to the operation of block 206 in FIG. 2 as discussed above. At the beginning of this stage, an unsecured DLS link has been set up between stations QSTA-A and QSTA-B. Additionally, each of these stations is storing a respective set of KCK and KEK keys provided to them during a previous RSNA link set up (e.g., in accordance with the operations of block 200 and FIG. 3), as well as identifiers for the MIC and Wrap encryption algorithms implemented for the security scheme employed for the WLAN.

Typically, a request to deploy the security measures will be initiated by the initiator of the DLS link, although this isn't a strict requirement. Accordingly, the secure link set up process illustrated in FIG. 5a is initiated by station QSTA-A, which generates a random number R_A in a block 500 and sends a message 502 including R_A concatenated with the MAC address of stations QSTA-B and QSTA-A (MAC_B and MAC_A) to station QSTA-B.

In response to receiving message 502, station QSTA-B generates its own random number R_B in a block 504, and generates a message 506 to the QAP containing a concatenation of R_B, R_A, MAC_B, and MAC_A. Thus, this message binds the identities of both stations QSTA-A and QSTA-B to the random numbers R_A and R_B. Message 506, is then sent from station QSTA-B to the QAP. In response to receiving message 506, the QAP extracts the values for each of R_B, R_A, MAC_B, and MAC_A, and stores them in memory.

Next, in a block 508, the QAP generates a symmetric session key K_AB and a Key Name identifier KID_AB. In one embodiment, K_AB is a random number of sufficient length applicable to the WLAN environment to computationally guarantee security in view of existing computing capabilities. For example, under today's computing capabilities, security keys having a length of 128-bit or above are generally termed computationally secure in view of the computing capabilities of current supercomputers. It is further noted that since the computing capabilities of WLAN stations are typically orders of magnitude lower than supercomputers, the length of the keys describe herein may be significantly less than 128 bits, such as but not limited to 64-bit keys.

Meanwhile, in one embodiment KID_AB is calculated using the following equation:

$$KID\_AB := \text{hash}(R\_B \| R\_A \| MAC\_B \| MAC\_A) \quad (1)$$

In general, one of many various well-known hash functions may be employed in Equation 1, such as SHA (Secure Hash Algorithm)-1, SHA-256, or AES (Advanced Encryption Standard) in the Davies-Meyer mode.

Once the values for K_AB and KID_AB are generated, the QAP generates a pair of security strings SA and SB to be respectively employed for securely transferring the K_AB and KID_AB values to stations QSTA-A and QSTA-B. For example, security string values SA and SB are generated using the following equation:

$$SA := R\_A \| MAC\_B \| MAC\_A \| \text{Wrap}\ (KEK\_A, K\_AB\text{-} \| KID\_AB) \quad (2a)$$

$$SB := R\_B \oplus MAC\_B \| MAC\_A \| \text{Wrap}\ (KEK\_B, K\_AB\text{-} \| KID\_AB) \quad (2b)$$

Under the foregoing equations, the Wrap (parain 1, paraln 2) function corresponds to an agreed-to key wrap encryption algorithm employed by the WLAN deployment and identified by the Wrap_ID value stored at the QAP and each of stations QSTA-A and QSTA-B. In one embodiment, the Wrap function corresponds to the NIST (National Institute of Standards and Technology) key wrap algorithm, defined in IETF RFC (Internet Engineering Task Force Request for Comment) 3394, Advanced Encryption Standard Key Wrap Algorithm, September 2002. Other encryption algorithms may also me employed.

In addition to generating the security string SA and SB, the QAP also generates a hash on each of these strings using a hash function identified by an agreed-to MIC algorithm identified by the MIC_ID values distributed during the RSNA link set up previously performed. As shown by the following equations 3a and 3b:

$$\text{hash}(SA) := \text{MIC } (KCK\_A, R\_A \| MAC\_B \| MAC\_A \| \text{Wrap}(KEK\_A, K\_AB \| KID\_AB)) \quad (3a)$$

$$\text{hash}(SB) := \text{MIC } (KCK\_B, R\_A \| MAC\_B \| MAC\_A \| \text{Wrap}(KEK\_B, K\_AB \| KID\_AB)) \quad (3b)$$

The Message Integrity Check (MIC) algorithm employs the respective key conformation keys KCK_A and KCK_B as the hash keys that operate on the respective security strings SA and SB. In general, the MIC algorithm may employ one of many well-known hash algorithms that are implemented by the WLAN security scheme. For example, in one embodiment, the HMAC SHA-1 algorithm or AES in CMAC mode may be employed as the MIC algorithm. Other hash algorithms may also be implemented in a similar manner.

Once the security strings and corresponding MIC hashes are generated, messages 510 and 512 containing the security string concatenated with the hash of the security string for each of stations QSTA-A and QSTA-B are sent from the QAP to these respective stations. Continuing at the top of FIG. 5b, upon receipt of their respective messages, each of stations QSTA-A and QSTA-B first performs a check on the hash portion of the message to confirm the authenticity of the message. It does this by performing a similar hash using the hash algorithm identified by its stored MIC_ID value on the security string portion of the message using its stored key confirmation key as the hash key. For example, station QSTA-A would evaluate the following equality to determine if it is TRUE:

$$\text{MIC}(KCK\_A, SA) = \text{hash}(SA) \quad (4)$$

As depicted by a decision block 514, if the inequality evaluates to TRUE, the authenticity of the message is confirmed. Under such a result, the QSTA then unwraps the K_AB and KID_AB values using its key encryption key and the agreed-to Wrap encryption algorithm, which is identified by the Wrap_ID value. This operation is performed by station QSTA-A in a block 518. If the result of decision block 514 is FALSE, then the message received from the QAP is either corrupted, or it was sent by another station or entity "faking" that it is the QAP. Under this circumstance, the entire process should be restarted.

Similar operations are performed at station QSTA-B. In this case, the equality, $$\text{MIC}(KCK\_A, SB) = \text{hash}(SB) \quad (5)$$

is evaluated in a decision block 516. If the result is TRUE, station QSTA-B unwraps the K_AB and KID_AB values using its key encryption key and the agreed-to Wrap encryption algorithm identified by the Wrap_ID value, as depicted in a block 518. As before, if the result is FALSE, the process is restarted.

Another aspect of the messaging scheme is the including of the previously-generated random numbers R_A and R_B that is employed in the respective messages 510 and 512 sent to stations QSTA-A and QSTA-B. In some instances, an initiator station may have to send out multiple secure link initiation request messages. By comparing the random number it generated for a given request message with first portion of the security string, the request message that was successful can be identified.

At this point, each of stations QSTA-A and QSTA-B have extracted the same values for symmetric session key K_AB and key name KID_AB from respective messages 510 and 512. These stations then perform a 4-Way Handshake using symmetric session key K_AB as the PMK, as depicted by a message exchange 522 and described in further detail with reference to FIG. 6 below. A corresponding Pairwise DLS Transient Key (PDTK) is then derived from the PMK, using the 4-Way Handshake between the two stations, and installed in a block 524 at each of stations QSTA-A and QSTA-B. These stations may then employ the PDTK to implement a secure link 526 using well-known encryption techniques.

In connection with the foregoing activities, the QAP should delete the symmetric session key K_AB, or otherwise prevent any other element in the WLAN from accessing this key. Since the PTK ultimately derived from key K_AB is only used for sending messages between stations (e.g., QSTA-A and QSTA-B), there is no reason for the QAP to keep key K_AB.

Figure 6:
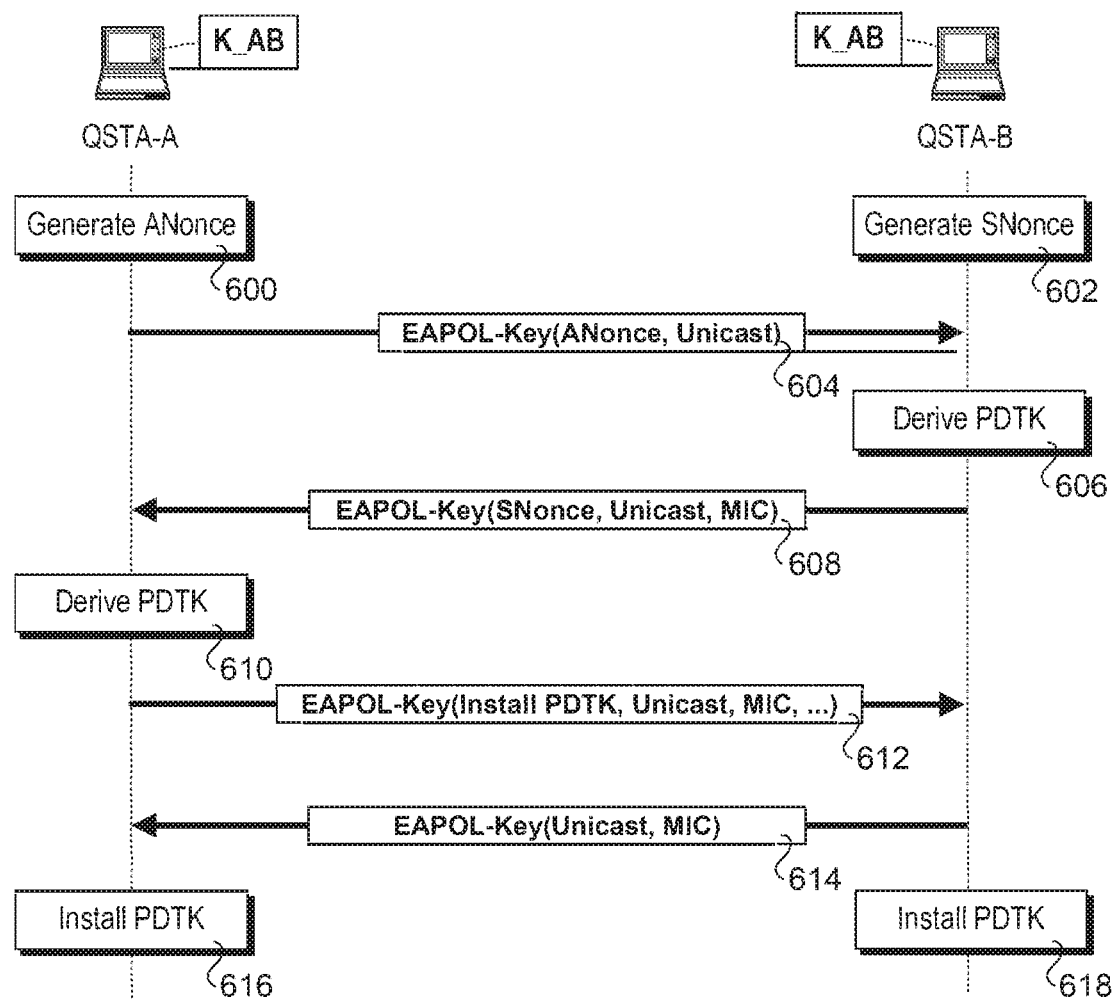
FIG. 6 is a message flow diagram illustrating a 4-Way Handshake used to install a Pairwise DLS Transient Key (PDTK) used to encrypt messages sent over a secure direct link.

FIG. 6 illustrates one embodiment of 4-Way Handshake 522. At the start of the sequence, each of stations QSTA-A and QSTA-B have received a copy of K_AB, which operates as a PMK. The 4-Way Handshake is similar to other types of key establishment protocols, and is described in the 802.11i™-2004 Standard. In the exemplary message exchange, station QSTA-A is the EAP authenticator (A) and station QSTA-B is the EAP supplicant.

In a block 600, station QSTA-A generates a nonce ANonce. Similarly, in a block 602, station QSTA-B generates a nonce SNonce. A nonce is a number used once in security schemes and typically may comprise a random number or a current time (in number form). Station QSTA-A sends a first message 604 comprising an EAPOL-Key frame containing the ANonce and a Unicast identifier code to station QSTA-B. In response, station QSTA-B derives a PDTK from its copy of the PMK (K_AB) in a block 606. Station QSTA-B then sends a message 608 comprising an EAPOL-Key frame containing the SNonce, Unicast identifier code, and a MIC identifier to station QSTA-A. In response, station QSTA-A derives its PDTK from its copy of the PMK in a block 610.

The 4-Way Handshake is completed using the third message 612 and the fourth message 614. The third message 612 comprises an EAPOL-Key frame containing indicia to tell the recipient to install the PDTK, the Unicast identifier code, the MIC identifier, and potentially additional optional parameters, such as a GTK. The fourth message 614 comprises an EAPOL-Key frame containing the Unicast identifier code and the MIC identifier. After exchange of the third and fourth messages 612 and 614, the PDTKs are installed at stations QSTA-A and QSTA-B, as depicted by respective blocks 616 and 618.

To support transport of the messages between the various endpoints in FIGS. 5a and 5b, in one embodiment authentication management frames are employed to encapsulate the message data, as defined by section 7.3 in the IEEE 802.11i™-2004 Standard. Other data encapsulation frame formats may also be employed in a similar manner.

In general, the random numbers described herein may be generated by a true random number generator or a pseudo random number generator (provided the bit length and randomness of the random number is sufficient). Furthermore, the random numbers may be generated using either software- or hardware-based mechanisms, using well-known algorithms.

In general, the logic for performing the operations of the wireless stations described herein will be primarily or solely implemented via execution of software and/or firmware instructions on the station's host device. For example, for stations such as a notebook computer or desktop computer, the logic may be generally implemented in an operating system component or an application program that runs on an operating system. For instance, in one embodiment the logic is implemented in a WLAN operating system driver. Meanwhile, for hand-held devices and the like, the logic may be typically implemented via firmware or as an application running on a host operating system built into the device.

In addition to implementing operations via execution of software and firmware, other operations may be implemented via built-in hardware logic, such as programmed logic contained in FPGAs (field programmable gate arrays) ASICs (Application specific integrated circuits), and similar circuits. Techniques for implementing logic using these and other hardware-based mechanisms are well-known in the electronic arts.

The operations performed by the access points described herein are typically implemented in a somewhat different manner than for the stations. Unlike the general-purpose capabilities provided by a WLAN station, a typical AP comprises a stand-alone device of relatively low cost that is configured to perform dedicated WLAN host operations. As such, the AP device does not employ an operating system (or employs a very minimal operating system), but rather implements its logic via built-in hardware logic and execution of firmware on a built-in processor element or the like.

Figure 7:
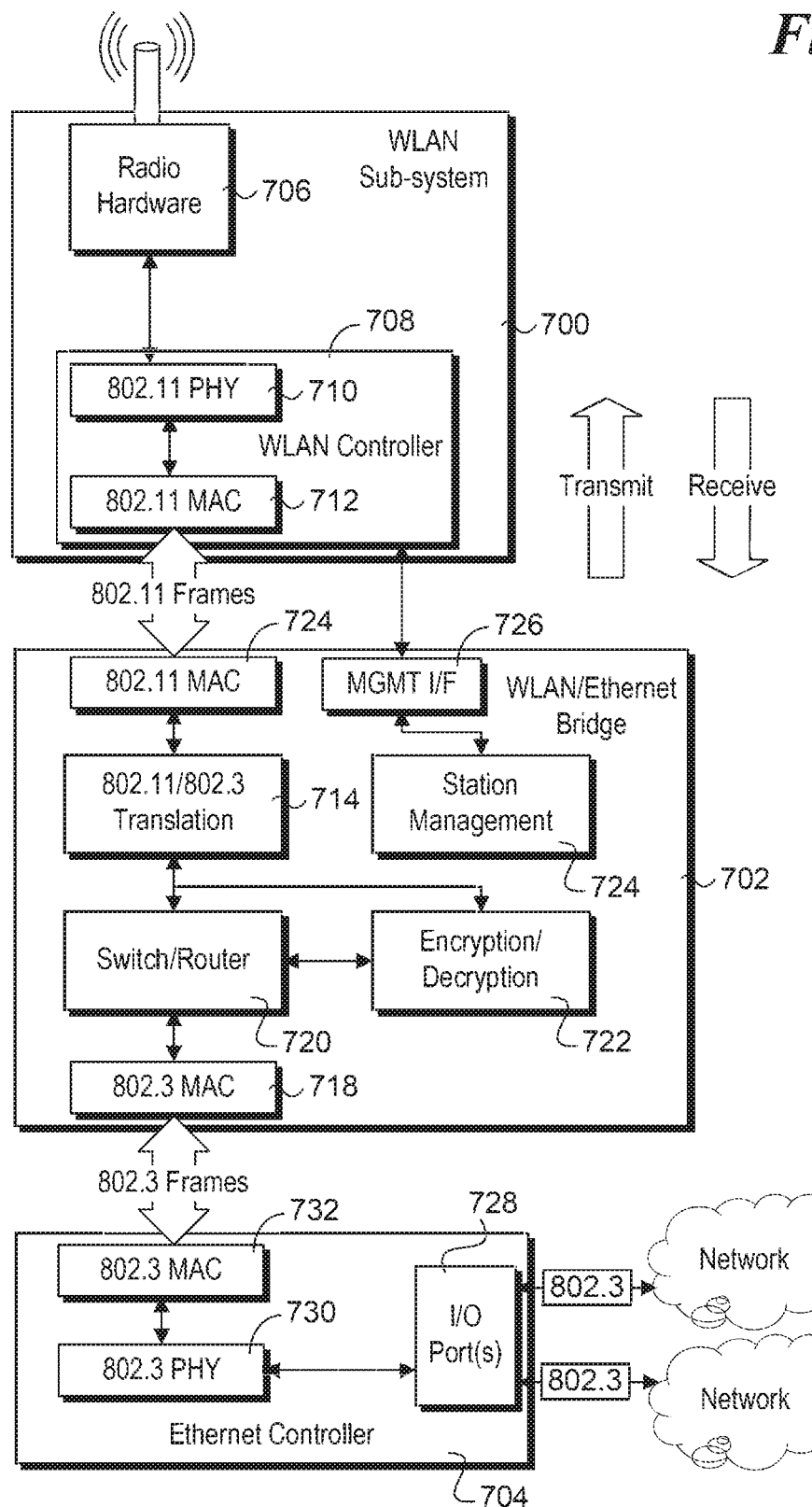
FIG. 7 is a schematic diagram illustrating various functional blocks employed by a wireless access point (AP)

In further detail, FIG. 7 shows a block diagram illustrating the principle functional blocks of a typical 802.11 wireless access point. At the top level, the blocks include a WLAN sub-system 700, a WLAN/Ethernet bridge 702, and an Ethernet controller 704. The WLAN sub-system generally includes components use to facilitate WLAN operations at the PHY (Physical) layer, as well as control of the 802.11 air interface. For simplicity, these components are depicted as including radio hardware 706 and a WLAN controller 708. As used herein, the WLAN radio hardware comprise the components of a wireless AP used to generate and process radio signals that are employed for the air interface to facilitate communications between the AP and WLAN stations. Such components will typically include an antenna, as well and analog and digital circuitry for generating outgoing and processing received radio frequency (RF) signals in accordance with the applicable WLAN protocol(s) employed by the AP.

The WLAN controller is further depicted as including an 802.11 PHY block 710, and an 802.11 MAC (Media Access Control) block 712. As will be recognized by those skilled in the networking arts, the PHY and MAC blocks are respectively associated with the Physical and Data Link layers, which comprise the two lowest layers (layer-1 and layer-2) in the seven-layer OSI (Open System Interconnect) network communication model.

As its name implies, WLAN/Ethernet bridge 702 is employed as a bridge between 802.11 WLAN signals and 802.3 Ethernet signals. More particularly, in the illustrated architecture, WLAN/Ethernet bridge 702 provides an interface between 802.11 frames passed to and from the WLAN sub-system, and 802.3 frames passed to and from Ethernet controller 704. This is facilitated, in part, by an 802.11/802.3 translator 714, which translates frame formats between 802.11 and 802.3 and vice-versa. As an option, the frame translation operations may be performed by WLAN controller 708.

As discussed above, an access point may also need to perform switching and/or routing functions. At one level, switching operations are performed via WLAN sub-system 700, such as managing access to the WLAN channel(s) using collision avoidance mechanisms and the like, since by its nature, the WLAN air interface comprises a shared medium necessitating some type of switching mechanism. Additionally, the AP must perform switching/routing operations, wherein packets received at an input side of an input/output (I/O) port are routed to either an appropriate destination station via the WLAN sub-system or to another I/O port to be transferred to another network. For illustrative purposes, the switching and routing operations are depicted in FIG. 7 as being performed by a switch/router block 720 on WLAN/Ethernet bridge 702; however, it will be understood that some of the switching and routing operations may be performed by Ethernet controller 704.

Another operation typically provided by an access point relates to security. Not only is a WLAN signal sent over a shared medium, it may be accessed (at the signal level) by any station within the AP's coverage area, regardless of whether that station is authorized or not to access the AP. Accordingly, to control AP access, various security schemes are implemented, such as WEP (Wired Equivalent Privacy) and WPA (Wi-Fi Protected Access) schemes. Under these schemes, packets are encrypted using some security key infrastructure, such as shared keys, rotating keys, etc. At the same time, Ethernet transmissions are typically are either a) not encrypted or b) encrypted using decryption/encryption managed by the transmission endpoints rather than the AP (e.g., Virtual Private Connections, Secure Socket Layer security, etc.) To facilitate the encryption and decryption operations necessary to support secure WLAN traffic, WLAN/Ethernet bridge 702 also includes an encryption/decryption block 722. Generally, some or all of the operations illustrated by encryption/decryption block 722 may be performed by WLAN sub-system 700, depending on the particular AP architecture.

Another operation provided by an AP is station management. For example, prior to being permitted access to AP services, a station typically needs to perform a registration operation or the like, such as performed during an RSNA link set up. During this process, the MAC address of the station will be acquired and the station will be identified/authenticated, an IP (Internet Protocol) address of the station will be dynamically or statically allocated and stored in an MAC-to-IP address translation table access by switch/router 720, and other related operations are performed. The station management operations are collectively depicted as being performed by a station management block 724, which access WLAN controller 708 via a management interface 726.

The Ethernet controller 704 is used to provide the interface between the AP and various networks to which the AP is communicatively coupled via corresponding network infrastructure, such as switches, bridges, routers, etc. To facilitate these operations, the Ethernet controller typically includes one or more I/O ports 728, an 802.3 PHY block 730, and an 802.3 MAC block 732. In general, I/O ports 728 will be coupled to one or more networks via corresponding IEEE 802.3 (Ethernet) links. Accordingly, such ports are alternately referred to as Ethernet ports or Ethernet I/O ports. In other instances, an Ethernet port name includes its underlying transmission rate, such as a GigE (Gigabit per second Ethernet) port for for Ethernet ports supporting GigE transmission rates.

The partitioning of the functional blocks illustrated in FIG. 7 is merely for illustrated purposes. Generally, the functional blocks may be implemented on one or more physical components, such as integrated circuits and analog circuitry corresponding to radio hardware 706. In some implementations, such as discussed below, the functional blocks of WLAN/Ethernet Bride 702 and Ethernet controller 704 will be combined on a single integrated circuit. Under such implementations, there will not be a duplication of an 802.3 MAC block, such as depicted by 802.3 MAC blocks 718 and 732 in FIG. 7.

Typically, the operations depicted by all or a portion of the various functional blocks depicted for the WLAN/Ethernet bridge are facilitated via execution of corresponding software modules that are executed on an embedded processor or the like, or otherwise via embedded hardware logic. The various logic and processor elements may comprise discreet components, or may be combined on one or more integrated circuits or the like.

Figure 8:
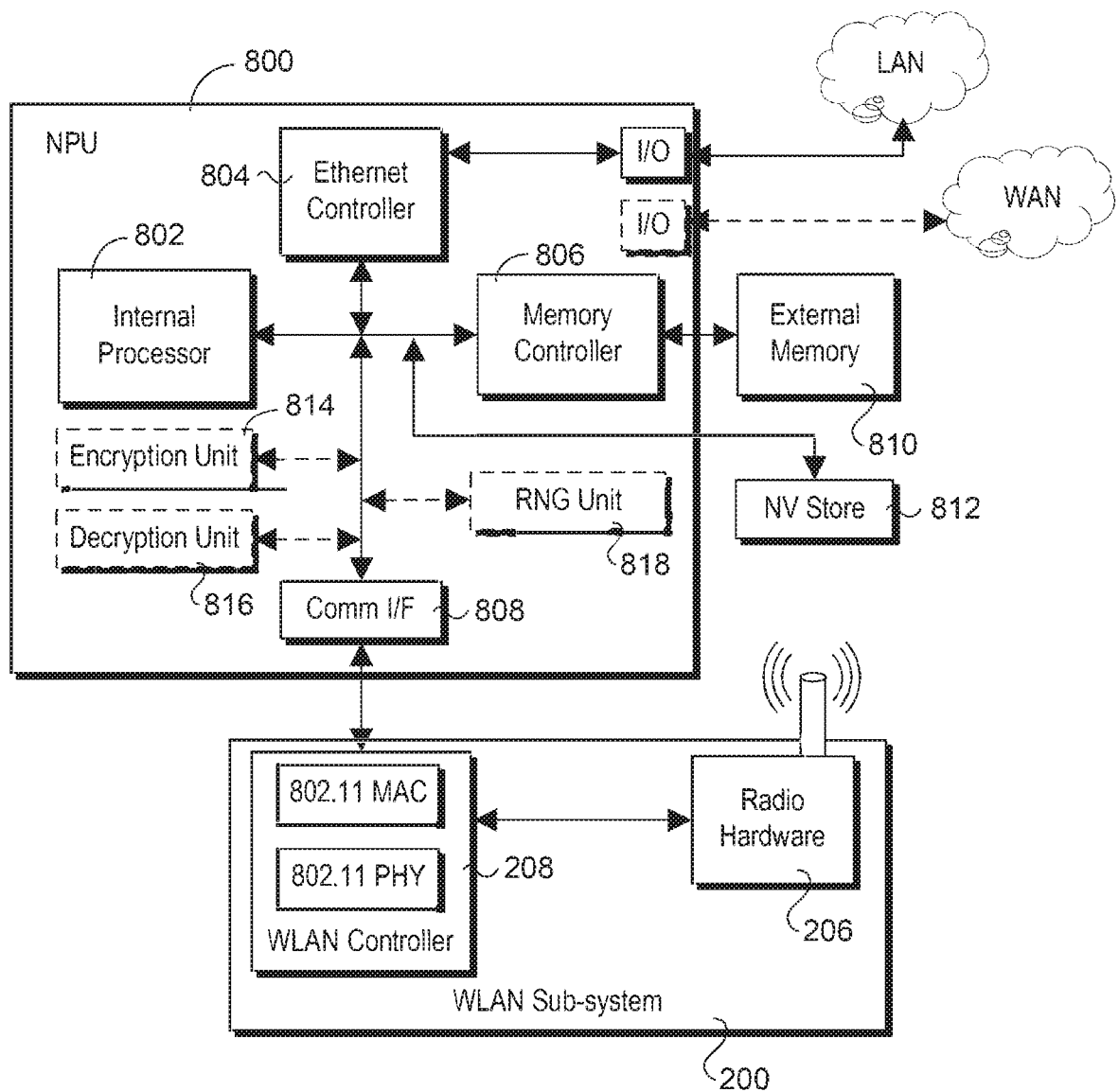
FIG. 8 is a schematic diagram illustrating a wireless AP employing a network processor unit (NPU) that may be used to implement aspects of the security mechanisms described herein.

FIG. 8 shows one embodiment of an AP architecture employing a Network Processor Unit (NPU) 800 that is used to perform functions generally analogous to those described above for WLAN/Ethernet Bridge 702 and Ethernet controller 704 of FIG. 7. NPU 800 includes an internal (embedded) processor 802 coupled to an Ethernet controller 804, a memory controller 806, and a communication interface 808 via an internal bus structure or the like. The memory controller 806 provides access to an external memory 810, which will typically comprise some type of DRAM- (Dynamic Random Access Memory) based memory, such as DDRDRAM (double data-rate DRAM), SDRAM (Synchronous DRAM), RDRAM (Rambus DRAM), etc. Communication interface 808 provides an interface to WLAN controller 708. In general, this interface may be some type of bus- or serial-based interface.

Instruction to be executed on internal processor 802 to perform associated AP operations will typically be stored in some type of non-volatile (NV) storage device, such as depicted by an NV store 812. For example, NV store may generally comprise a rewritable non-volatile memory, such as a flash memory device. Typically, internal processor 802 may access NV store either directly, through memory controller 806, or through another memory interface (not shown). A portion of the instructions may also be downloaded during runtime using a carrier wave file or the like and stored in external memory 806.

Encryption and decryption operations may typically be performed via execution of corresponding software/firmware on internal processor 802, or via built-in hardware components, such as depicted by optional encryption and decryption units 814 and 816. Similarly, random numbers may be generated via execution of software/firmware on internal processor 802, or via a build-in random number generator (RNG) unit 818.

As described above, various operations performed by the WLAN stations and the APs herein may be implemented via execution of software and/or firmware on some type of processing element. Thus, embodiments of this invention may be used as or to support instructions embodied as one or more software/firmware components executed upon some form of processing element or otherwise implemented or realized upon or within a machine-readable medium. A machine-readable medium includes any mechanism for storing or transmitting information in a form readable by a machine (e.g., a computer). For example, a machine-readable medium can include articles of manufacture such as a read only memory (ROM); a random access memory (RAM); a magnetic disk storage media; an optical storage media; and a flash memory device, etc. In addition, a machine-readable medium can include propagated signals such as electrical, optical, acoustical or other form of propagated signals (e.g., carrier waves, infrared signals, digital signals, etc.).

The mechanisms disclosed herein for setting up secure direct link between WLAN stations provide significant advantages over the security scheme defined in the IEEE 802.11e/D13 draft Standard. Notably, a newly generated key is employed to secure each direct link session, based on a randomly-generated and statistically unpredictable number. Additionally, the key distribution mechanism is computationally unbreakable, guaranteeing that only the intended recipients will be able to access the shared session key from which the PDTK is derived. Furthermore, the key distribution mechanism provides built-in authentication and message identity features, ensuring each direct link participant station that the only WLAN elements having access to a session key are the participant stations and the QAP.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. An apparatus, comprising:
a memory; and
a processor element coupled with the memory to:
  set up a direct link between first and second stations in a wireless local area network (WLAN) hosted by the apparatus, the direct link comprising a new communication session, the processor element coupled with the memory to set up a first Robust Security Network Association (RSNA) link between the first station and the apparatus and set up a second RSNA link between the second station and the apparatus, wherein the apparatus comprises an access point (AP) and the first and second stations are associated with the AP;
  receive, from the second station, a message comprising:
    a random number generated by the first station;
    a medium access control (MAC) address of the first station; and
    a random number generated by the second station;
  generate a first string comprising:
    a key value generated for the new communication session;
    the random numbers generated by the first and second stations; and
    a MAC address of the second station;
  generate a second string comprising:
    the key value generated for the new communication session;
    the random numbers generated by the first and second stations; and
    the MAC address of the first station; and transfer the first and second strings to the first and second stations, respectively, to secure the direct link between the first and second stations.

2. The apparatus of claim 1, wherein the direct link is set up using a Direct Link Setup (DLS) protocol.

3. The apparatus of claim 1, the processor element coupled with the memory to:
generate the key value for the new communication session.

4. The apparatus of claim 3, wherein the key value for the new communication session comprises a random number.

5. The apparatus of claim 1, wherein a wrap encryption algorithm is to encrypt the first and second strings.

6. The apparatus of claim 1, the processor element coupled with the memory to:
receive the random number generated by the first station;
transfer the random number generated by the first station in a message to the second station;
transfer the random number generated by the first station from the second station to the apparatus; and
embed the random number generated by the first station in a message sent from the apparatus to the first station.

7. A non-transitory computer-readable medium storing instructions which when executed by a processor element cause the processor element to:
set up a direct link between first and second stations in a wireless local area network (WLAN), wherein the processor element is part of an apparatus, the direct link comprising a new communication session, the processor element coupled with the memory to set up a first Robust Security Network Association (RSNA) link between the first station and the apparatus and set up a second RSNA link between the second station and the apparatus, wherein the apparatus comprises an access point (AP) and the first and second stations are associated with the AP;
receive, from the second station, a message comprising:
a random number generated by the first station;
a medium access control (MAC) address of the first station; and
a random number generated by the second station;
generate a first string comprising:
a key value generated for the new communication session;
the random numbers generated by the first and second stations; and
a MAC address of the second station;
generate a second string comprising:
the key value generated for the new communication session;
the random numbers generated by the first and second stations; and
the MAC address of the first station; and
transfer the first and second strings to the first and second stations, respectively, to secure the direct link between the first and second stations.

8. The computer-readable medium of claim 7, wherein the direct link is set up using a Direct Link Setup (DLS) protocol.

9. The computer-readable medium of claim 7, storing instructions which when executed by a processor element cause the processor element to:
generate the key value for the new communication session.

10. The computer-readable medium of claim 9, wherein the key value for the new communication session comprises a random number.

11. The computer-readable medium of claim 7, wherein a wrap encryption algorithm is to encrypt the first and second strings.

12. The computer-readable medium of claim 7, storing instructions which when executed by a processor element cause the processor element to:
receive the random number generated by the first station;
transfer the random number generated by the first station in a message to the second station;
transfer the random number generated by the first station from the second station to the apparatus; and
embed the random number generated by the first station in a message sent from the apparatus to the first station.

13. An apparatus, comprising:
means for a memory;
means for a processor element;
means for setting up a direct link between first and second stations in a wireless local area network (WLAN) hosted by an apparatus, the direct link comprising a new communication session, the processor element coupled with the memory to set up a first Robust Security Network Association (RSNA) link between the first station and the apparatus and set up a second RSNA link between the second station and the apparatus, wherein the apparatus comprises an access point (AP) and the first and second stations are associated with the AP;
means for receiving, from the second station, a message comprising:
a random number generated by the first station;
a medium access control (MAC) address of the first station; and
a random number generated by the second station;
means for generating a first string comprising:
a key value generated for the new communication session;
the random numbers generated by the first and second stations; and
a MAC address of the second station;
means for generating a second string comprising:
the key value generated for the new communication session;
the random numbers generated by the first and second stations; and
the MAC address of the first station; and
means for transferring the first and second strings to the first and second stations, respectively, to secure the direct link between the first and second stations.

14. The apparatus of claim 13, wherein the direct link is set up using a Direct Link Setup (DLS) protocol.

15. The apparatus of claim 13, further comprising:
means for generating the key value for the new communication session.

16. The apparatus of claim 15, wherein the key value for the new communication session comprises a random number.

17. The apparatus of claim 13, wherein a wrap encryption algorithm is to encrypt the first and second strings.

* * * * *